(12) United States Patent
Chiang

(10) Patent No.: US 6,809,759 B1
(45) Date of Patent: Oct. 26, 2004

(54) REMOTE CONTROL UNIT WITH PREVIEWING DEVICE FOR AN IMAGE-CAPTURING DEVICE

(75) Inventor: Chao-Tsung Chiang, Taipei (TW)

(73) Assignee: BenQ Corporation, Tao-Hsien (TW)

( * ) Notice: Subject to any disclaimer, the term of this patent is extended or adjusted under 35 U.S.C. 154(b) by 950 days.

(21) Appl. No.: 09/597,750

(22) Filed: Jun. 19, 2000

(51) Int. Cl.[7] .............................................. H04N 5/232
(52) U.S. Cl. ................................ 348/211.2; 348/211.8; 348/333.07; 348/333.13
(58) Field of Search ......................... 348/207.99, 207.1, 348/207.11, 220.1, 211.99, 211.1, 211.2, 211.3, 211.4, 211.8, 211.14, 255, 231.99, 333.06, 333.07, 333.11, 345, 373, 374, 375, 231.7; 455/456.5; 396/72; 386/107, 117, 118, 333.13

(56) References Cited

U.S. PATENT DOCUMENTS

| | | | |
|---|---|---|---|
| 4,837,817 A | | 6/1989 | Maemori |
| 5,539,107 A | | 7/1996 | Kutsher et al. |
| 6,256,060 B1 | * | 7/2001 | Wakui ..................... 348/211.2 |
| 6,330,400 B1 | * | 12/2001 | Bittner et al. .................. 396/72 |
| 6,522,889 B1 | * | 2/2003 | Aarnio ..................... 455/456.5 |
| 6,525,767 B2 | * | 2/2003 | Saito et al. ............... 348/231.7 |
| 2002/0005907 A1 | * | 1/2002 | Alten ..................... 348/333.11 |

FOREIGN PATENT DOCUMENTS

| | | |
|---|---|---|
| DE | 43 07 953 A1 | 9/1993 |
| DE | 196 43 858 A1 | 5/1998 |
| DE | 197 33 683 A1 | 5/1998 |
| DE | 198 44 635 A1 | 4/1999 |
| DE | 199 36 599 A1 | 3/2000 |
| EP | 0 522 330 B1 | 4/1998 |
| EP | 0884681 B1 | 11/2002 |
| TW | 393866 | 6/2000 |

OTHER PUBLICATIONS

Provisional Application Ser. No. 60/199,592 filed on Apr. 25, 2000.*

* cited by examiner

*Primary Examiner*—Tuan Ho
(74) *Attorney, Agent, or Firm*—Winston Hsu (57) ABSTRACT

A previewing system has a remote control that is detachably fixed to an image-capturing device. The remote control comprises a display panel and a control panel. A user can detach the remote control from the image-capturing device and use the control panel of the remote control to remotely control functionality of the image-capturing device. Furthermore, with the display panel, the user can preview an image that the image-capturing device will capture.

39 Claims, 5 Drawing Sheets

REMOTE CONTROL UNIT WITH PREVIEWING DEVICE FOR AN IMAGE-CAPTURING DEVICE

BACKGROUND OF THE INVENTION

1. Field of the Invention

The present invention concerns a previewing system and a method thereof. More specifically, a digital camera with a remote control that enables previewing and changing of a picture is disclosed. The remote control may be detachably connected to the digital camera, or it may be a separate device.

2. Description of the Prior Art

Remote controlled cameras, both standard and digital, are well known and documented in the art. Consider, for example, a prior art camera with a remote control that is detachably connected to the body of the camera. This remote control can be used to control various operative functions of the camera, such as triggering the shutter, performing a bulb (manually timed) exposure, zooming, etc.

Once novelty items on high-end cameras, users have come to expect such remote controls on all but the least expensive of cameras. This is due to the fact that they offer considerably more flexibility than the standard timed shutter release of old. With a simple press of a button, the user can direct the camera to take a picture when the user is ready, rather than after a preset delay. Nevertheless, as convenient as these remote controls are, they all have the same drawback: because the user is not looking through the viewfinder lens of the camera, he or she has only a general idea of the composition of the picture when using the remote control. That is, the picture taking by the remote control has traditionally been a blind art. Consequently, many fine pictures are ruined because the user misjudges his or her position in the frame of the picture.

SUMMARY OF THE INVENTION

It is therefore a primary objective of this invention to provide a remote control for an image-capturing device, the remote control having a display that enables a user to see the image that will be captured by the image-capturing device.

The present invention, briefly summarized, discloses an image-capturing device with a remote control. The remote control is detachably fixed to the image-capturing device and comprises a display panel and a control panel. A user can detach the remote control from the image-capturing device and use the control panel of the remote control to remotely control functionality of the image-capturing device. Furthermore, with the display panel, the user can preview an image that the image-capturing device will capture.

In a second embodiment of the present invention, the remote control may be a separate device, such as a personal data assistant (PDA). A user can use a keypad on the remote control to control functionality of the image-capturing device. The image-capturing device will also send images to the remote control that the remote control can present on its display panel, enabling the user to preview an image that will be captured.

It is an advantage of the present invention that the display on the remote control enables a user to see exactly what picture he or she is taking, as well as immediately seeing the effects of changing characteristics of the picture, such as zoom, focus, aperture settings and so on. Additionally, the user of the present invention does not have to be in the picture when using the remote control. The user can use the remote control to remotely take pictures of other people or objects, such as wildlife.

These and other objectives of the present invention will no doubt become obvious to those of ordinary skill in the art after reading the following detailed description of the preferred embodiment, which is illustrated in the various figures and drawings.

DETAILED DESCRIPTION OF THE PREFERRED EMBODIMENT

Figure 1:
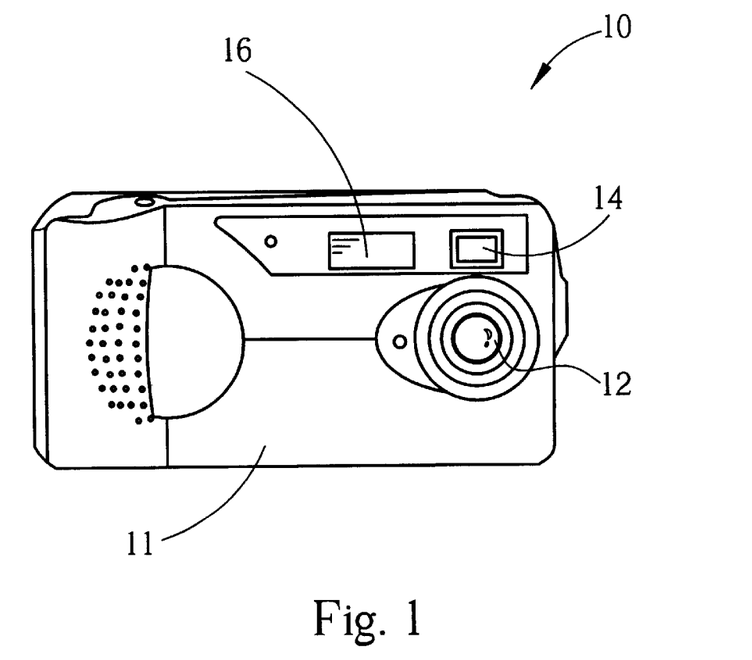
FIG. 1 is a front view of a digital camera according to the present invention.
Figure 2:
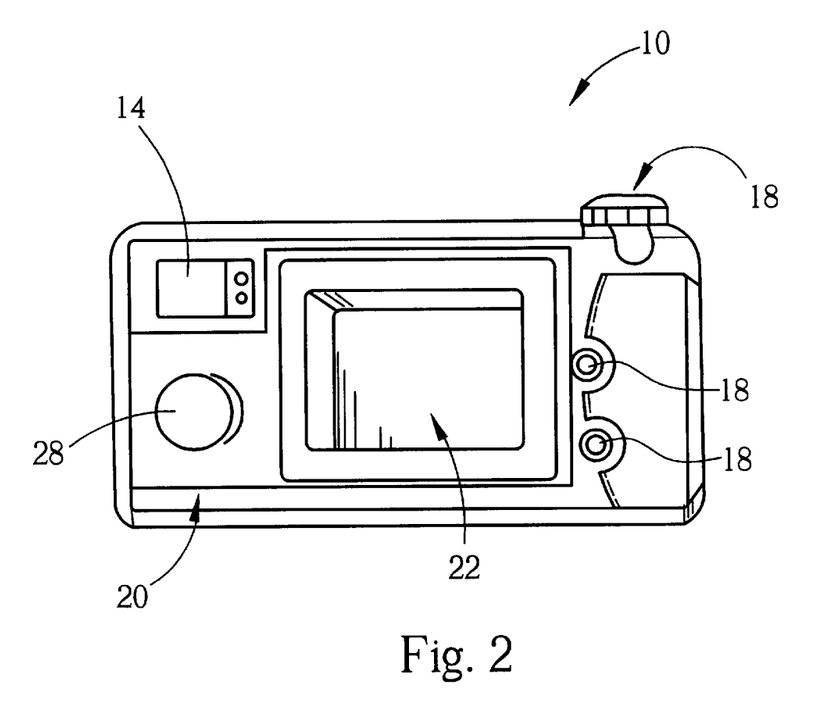
FIG. 2 is a rear view of the digital camera in FIG. 1.
Figure 3:
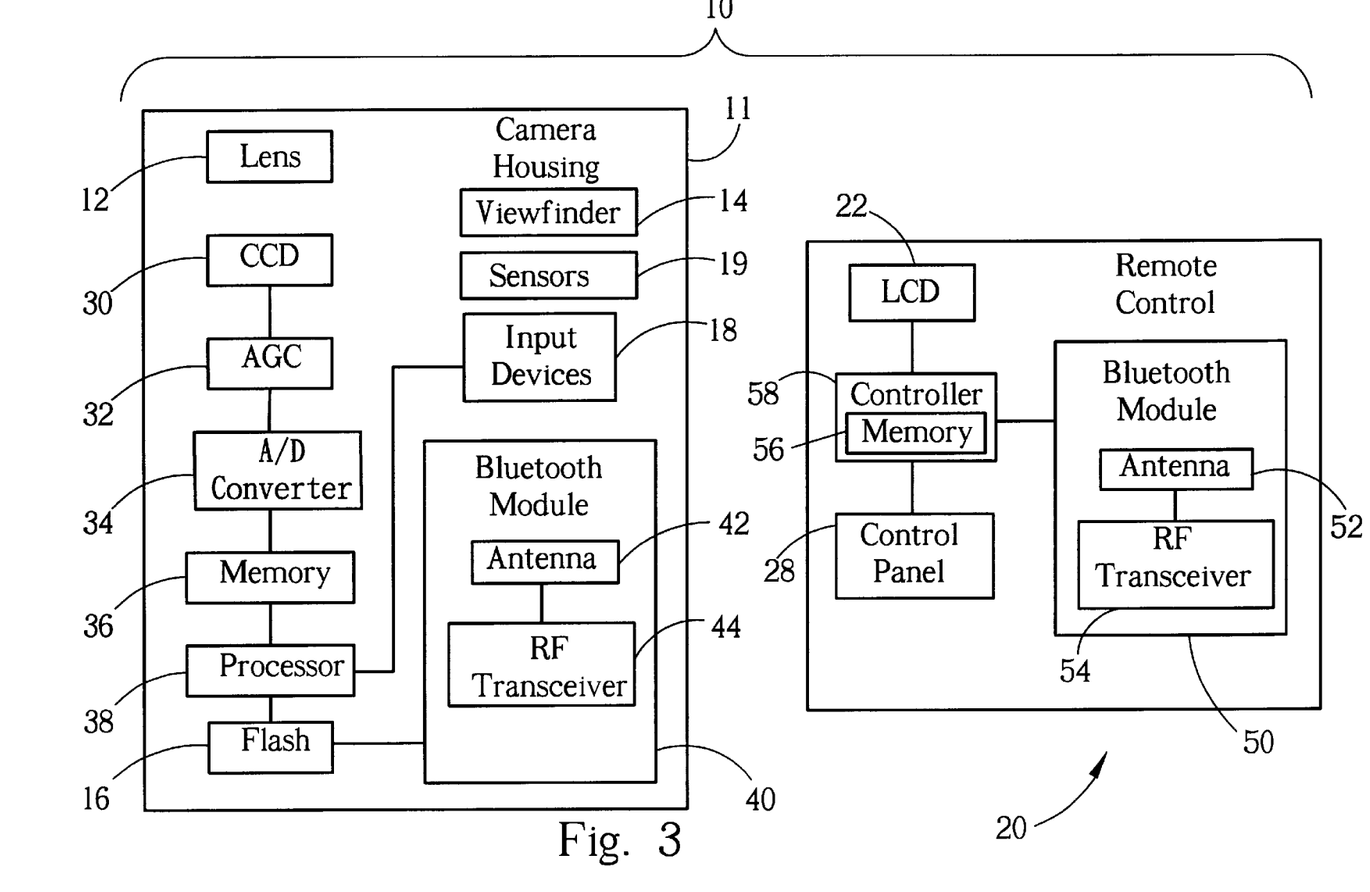
FIG. 3 is a function block diagram of the digital camera in FIG. 1.

Please refer to FIG. 1 to FIG. 3. FIG. 1 is a front view of a digital camera 10 according to the present invention. FIG. 2 is a rear view of the digital camera 10. FIG. 3 is a function block diagram of the digital camera 10. The digital camera 10 has a camera housing 11 into which is detachably mounted a remote control 20. The housing 11 comprises a lens 12, a viewfinder 14, a flash 16 and input devices 18. The input devices 18 may comprise a variety of buttons, knobs or the like to enable a user to control the digital camera 10. Fixed within the housing 11 are a charge-coupled device (CCD) 30, an automatic gain controller (AGC) 32, an analog-to-digital (A/D) converter 34, a memory 36, a processor 38 and a Bluetooth module 40. The Bluetooth module 40 comprises an antenna 42 and an RF transceiver 44. Other devices are also fixed within the housing 11, but are omitted as they are not directly relevant to the claims of this disclosure.

The Bluetooth module 40 is used to wirelessly send and receive data in the 2.4 GHz radio-frequency band, using a Bluetooth communications protocol. Bluetooth is an open standard that has been developed in consortium with a large number of manufacturers, and is well documented. For this invention, the Bluetooth module is used to send radio signals to, and receive them from, a corresponding Bluetooth module 50 in the remote control 20. Using the Bluetooth communications protocol, a communications link is established between the Bluetooth modules 40 and 50, i.e., data is exchanged between the main camera body 11 and the detachable remote control 20.

Although spoken of as a simple entity, it should be understood that the lens 12 of the preferred embodiment digital camera 10 is a complex device that comprises many elements. The basic functionality of the lens 12 is simply to focus light from a source image onto the CCD 30. However, the lens 12 can have added functionality to change the focussed image, such as zoom capabilities, and an irising aperture to change both the exposure and depth of field characteristics of the image.

The CCD 30 captures this focussed image and converts it into corresponding electrical signals. The strength of these signals is changed using the AGC 32, which has the effect of adjusting the brightness characteristics, or exposure characteristics, of the image. The adjusted signals are fed into the A/D converter 34 to yield a digital image. This process occurs continuously, and when a user presses a shutter button, which is one of the input devices 18 on the housing 11, the most recent digital image will be saved in the memory 36. A flash 16 can be used when taking pictures in low-light conditions. The processor 38 is electrically connected to all of the electrical devices noted above to control and direct their operations.

The above description is intended to give only a cursory overview of the inner workings of the digital camera 10. Many other devices, and software, are used in the digital camera 10 to effect various modes of operation, such as auto-focussing, auto-exposure, flash control and auto-white balancing, as well as the viewing of pictures that are already present in the memory 36. With these various options, however, a digital image is finally produced, and this digital image is sent to the Bluetooth module 40. The Bluetooth module 40 converts the digital image according to the Bluetooth protocol, creating a transmission digital image, and then uses the RF transceiver 44 to broadcast corresponding radio signals from the antenna 42. Consequently, the transmission digital image is broadcast from the housing 11 of the digital camera 10 using the Bluetooth transmission protocol. The intended destination of this broadcast is the remote control 20. Detailed information regarding Bluetooth hardware and software can be obtained from www.bluetooth.com.

The remote control 20 comprises a liquid crystal display (LCD) 22 for viewing images, a control panel 28 to provide user input, a Bluetooth module 50, and a controller 58 electrically connected to all of these devices to control their functionality. The controller 58 comprises a memory 56 for storing both data and programs. The controller 58 executes the programs stored in its memory 56 to direct its operations, and thus controls the functionality of the remote control 20.

The Bluetooth module 50 of the remote control 20 is configured to interface with the Bluetooth module 40 within the camera housing 11. The Bluetooth standard has been designed to permit many Bluetooth-enabled devices to work in proximity to each other without interference. Hence, Bluetooth modules are configured to uniquely identify each other and thus not become confused by, or miscommunicate with, other Bluetooth devices. Using an antenna 52, the RF signals transmitted by the Bluetooth module 40 are received by the RF transceiver 54 of the Bluetooth module 50. These signals (i.e., the transmission digital image) are decoded to yield the digital image that was sent by the Bluetooth module 40. The controller 58 then causes the digital image to be shown on the LCD 22. Hence, the user can use the LCD 22 of the remote control 20 as a viewfinder, analogous to the viewfinder 14 on the camera housing 11. Changes to the composition of the picture to be taken with the digital camera 10 are shown on the LCD 22. With the remote control 20, a user can position himself or herself within the frame of the picture and know exactly what type of picture he or she will get.

Figure 4:
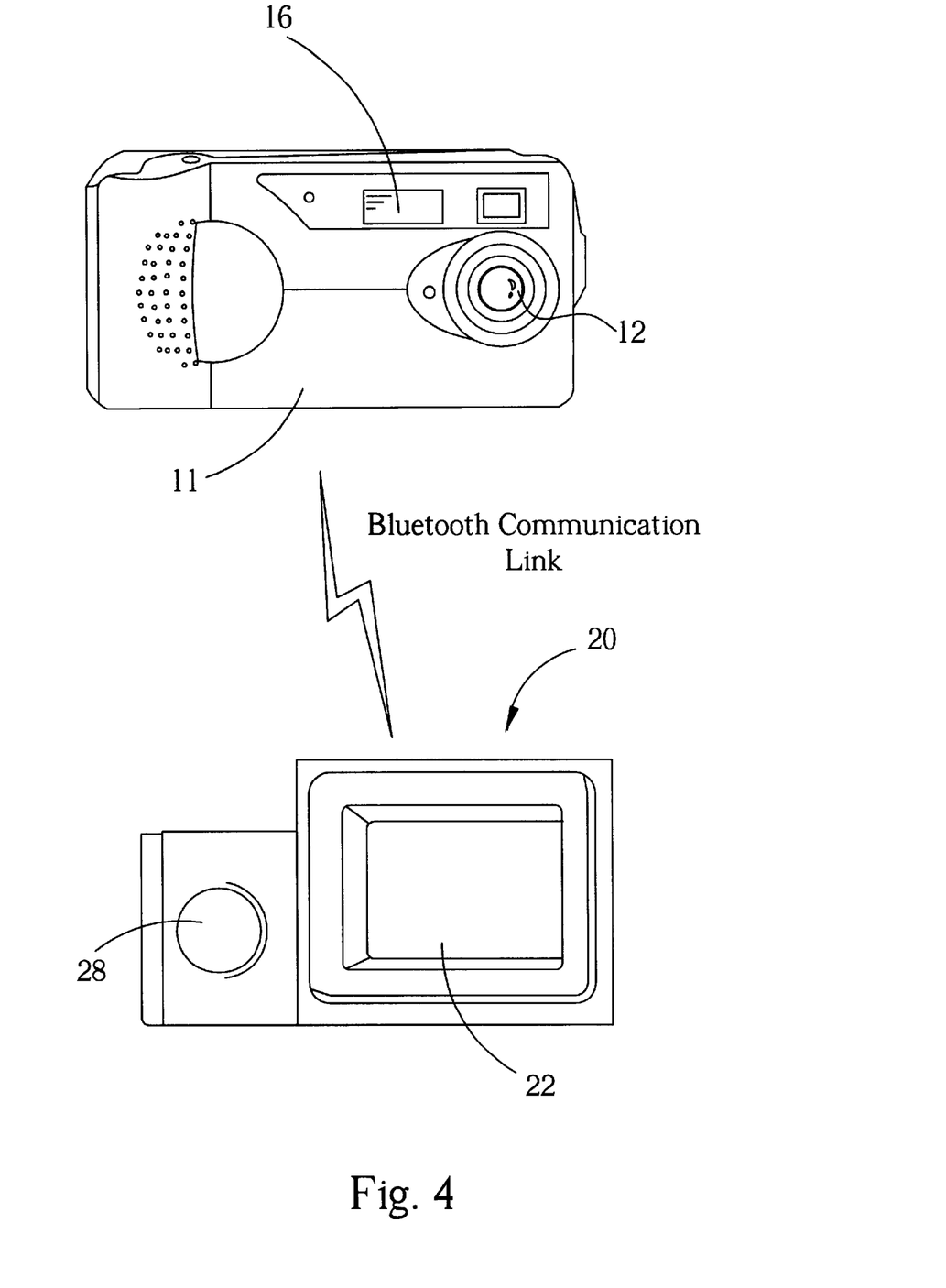
FIG. 4 is a perspective view depicting the remote control in FIG. 2 detached from the main camera housing.

For most operations of the digital camera 10, the remote control 20 will be attached to the back of the camera housing 11, as shown in FIG. 2. Sensors 19 in the camera housing 11 detect whether or not the remote control 20 is attached to the housing 11. If the remote control 20 is attached to the housing 11, then, in order to save battery power, the Bluetooth modules 40 and 50 are placed in a standby mode, as there is no need for them to be exchanging information. Camera functionality, in this case, is controlled through the input devices 18 on the housing 11. Of course, it is possible, however, to design physical electrical contacts between the housing 11 and the remote control 20 so that data can be exchanged between the two devices without using their respective Bluetooth modules 40 and 50. Such contacts are beneficial as the LCD 22 can then be used as an extra viewfinder when peering through the optical viewfinder 14 is inconvenient or impractical. The contacts also permit the control panel 28 to control the operations of the digital camera 10. Additionally, the LCD 22 could be used to review pictures that have already been taken and which are stored in the memory 36. Please refer to FIG. 3 and FIG. 4. FIG. 4 is a perspective view depicting the remote control 20 detached from the camera housing 11. In those situations when the remote control 20 of the digital camera 10 is desired, the user detaches the remote control 20 from the camera housing 11. The sensors 19 as described above detect that the remote control 20 has been detached, and the Bluetooth modules 40 and 50 go from a standby mode to an active mode. The Bluetooth module 40 in the camera housing 11 begins transmitting the most current digital images (about 35 per second) to the Bluetooth module 50 in the remote control 20 so that a user may preview an image to be captured. The following method is used to perform this function:

1. The CCD 30, in conjunction with the AGC 32 and lens 12, captures an image using the current focus, exposure, depth of field, zoom, etc. image capturing characteristics.

2. The captured image is converted into a digital image using the A/D converter 34.

3. The digital image is converted into a transmission image using the Bluetooth protocol.

4. The transmission image is broadcast to the remote control 20 using the RF receiver 44 and antenna 42.

5. The transmission image is received by the remote control 20 and decoded from the Bluetooth protocol to yield the digital image of step (2).

6. Any necessary adjustments are made to the digital image to conform it to the hardware requirements of the LCD 22, to create a display image.

7. The display image is shown on the LCD 22, thereby enabling a user to preview an image that will be captured by the digital camera 10.

The remote control 20 continuously displays these display images on the LCD 22. The user can use the control panel 28 to change the image capturing characteristics, such as zoom, exposure, depth of field, or focus. In a manner that corresponds to the exchanging of transmission image information, the remote control 20 uses the Bluetooth module 50 to send control signals generated by the control panel 28 to the Bluetooth module 40 in the main camera housing 11. These Bluetooth-encoded control signals are decoded by the Bluetooth module 40 and are sent to the processor 38. The processor 38 reacts to these control signals in an appropriate manner, such as changing the zoom of the lens 12, the exposure characteristics of the AGC 32, the irising of the lens 12, etc. Finally, when the user is satisfied with the picture composition, as indicated by the digital image shown on the LCD 22, he or she uses the control panel 28 to send a shutter signal to the processor 38. The processor 38 stores the current digital image, then, into the memory 36.

Note that, in low light conditions in which use of the flash 16 is desired, the processor 38 may not save to the memory 36 the most recent image when it receives the shutter signal from the remote control 20. Instead, it may save a following image that is taken using the flash 16. While the flash is charging, a charging signal is displayed on the LCD 22.

Figure 5:
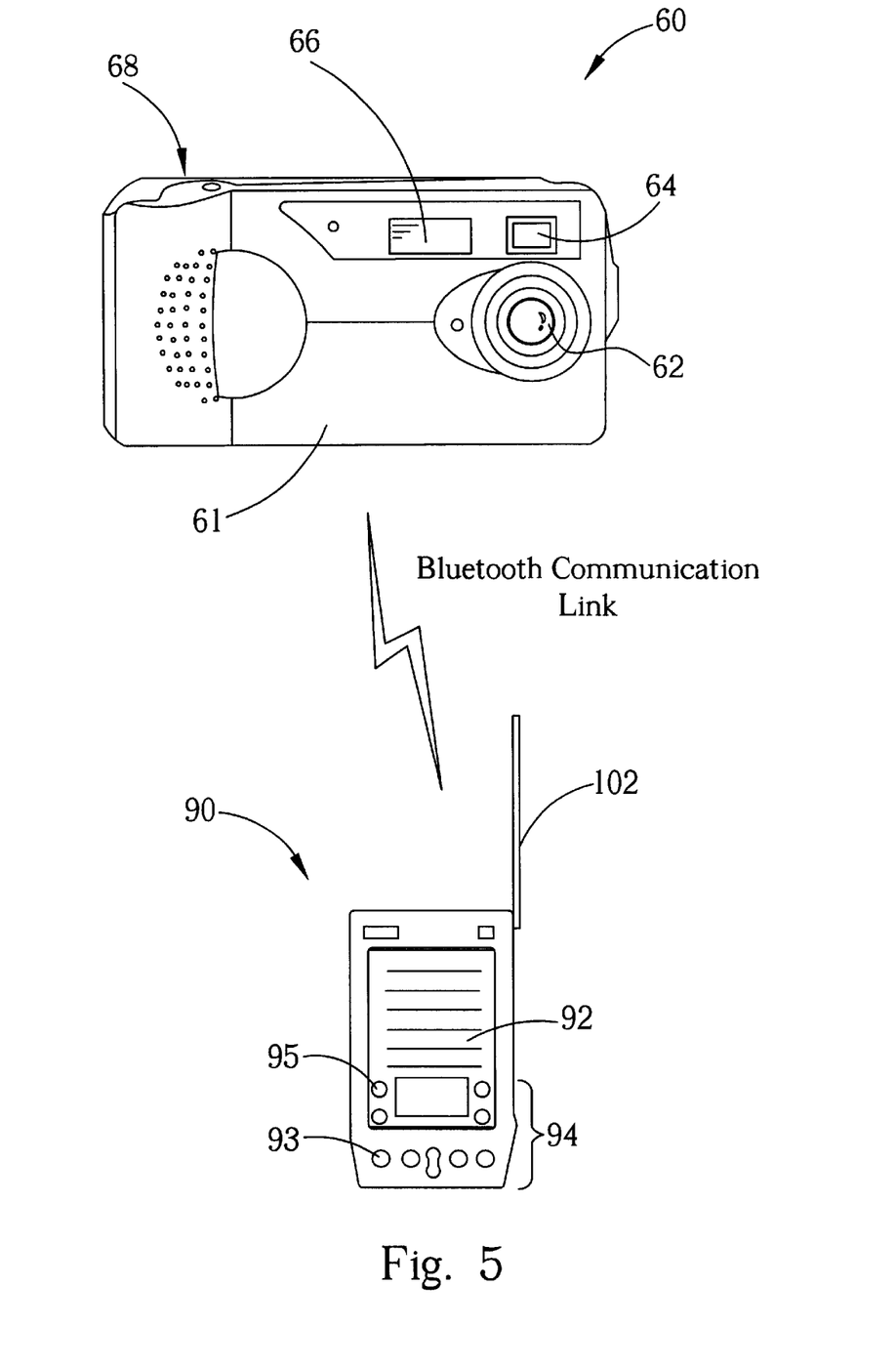
FIG. 5 is a perspective view of another image-capturing device that is remotely controlled by a portable device according to the present invention.
Figure 6:
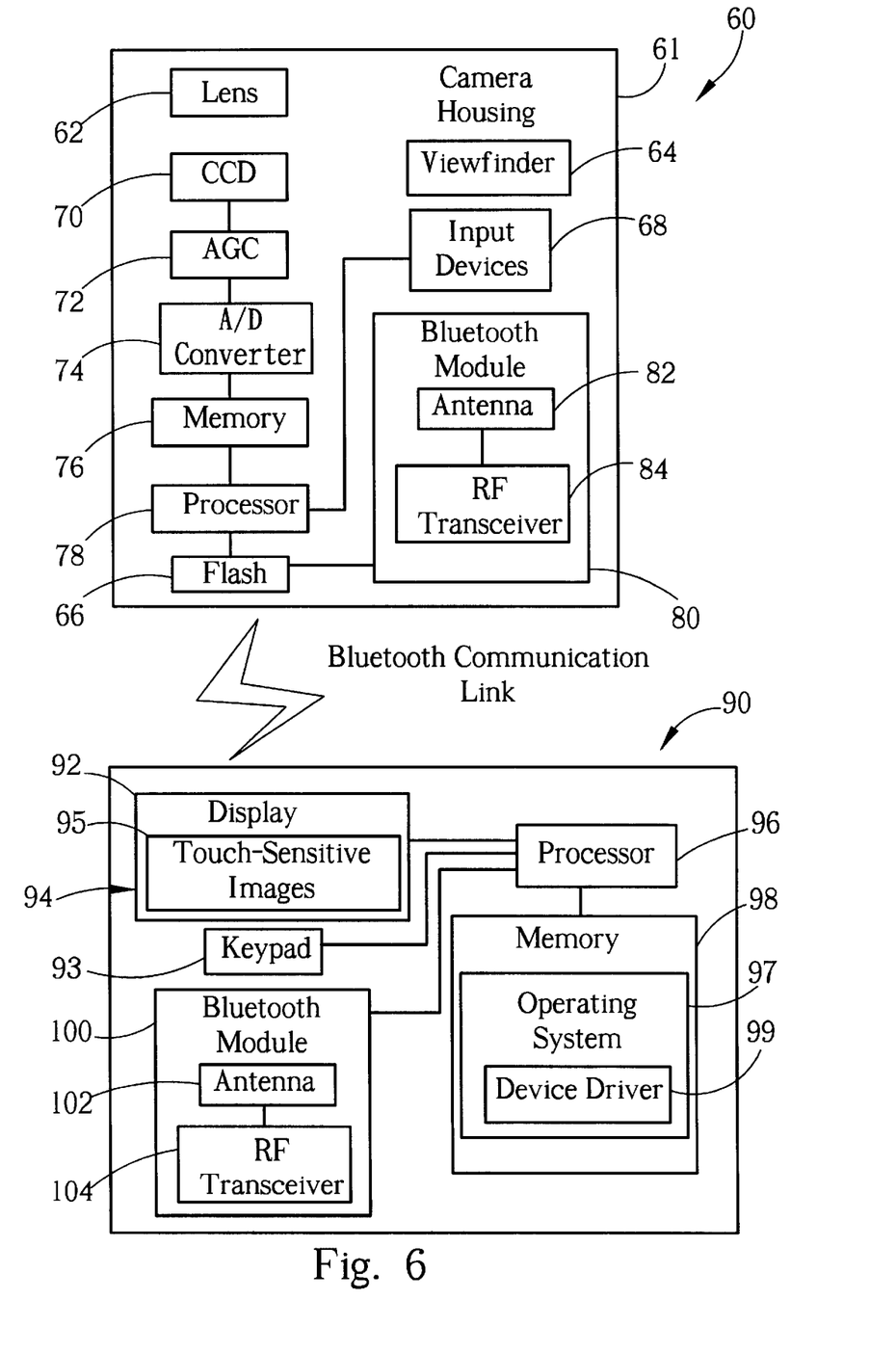
FIG. 6 is a function block diagram of the devices shown in FIG. 5.

Use of the Bluetooth module offers great flexibility to an image-capturing device of the present invention, for the use of a dedicated remote control is no longer required. As Bluetooth modules shall become more and more prevalent in portable devices, with the use of appropriate controlling software installed on the portable device, it is possible to use the portable device as a remote control of a present invention image-capturing device. Please refer to FIG. 5 and FIG. 6 for an example of this. FIG. 5 is a perspective view of another image-capturing device, a digital camera 60, that is remotely controlled by a portable device, a personal digital assistant (PDA) 90. FIG. 6 is a function block diagram of the digital camera 60 and the PDA 90.

The digital camera 60 is nearly identical to the first embodiment digital camera disclosed above except that it does not comprise a detachably connected remote control. Nearly identical remote control functionality is provided by the PDA 90. Hence, the digital camera 60 comprises a camera housing 61 into which are set a lens 62, a viewfinder 64, a flash 66 and input devices 68. Within the housing 61 are a CCD 70, an AGC 72, an A/D converter 74, a memory 76, a processor 78 and a Bluetooth module 80. The Bluetooth module 80 comprises an antenna 82 and an RF transceiver 84. All of these devices function in predominantly the same manner as in the first embodiment digital camera. However, some processor control functions may vary slightly in the second embodiment to account for the fact that there is no dedicated detachable remote control. Hence, the digital camera 60 needs none of the sensors of the first embodiment to determine whether or not a remote control is attached to the housing 61. Consequently, the Bluetooth module 80 will always remain in a standby mode unless it is awakened by signals from another Bluetooth module, or instructed by the user via the input devices 68.

The PDA 90 is a portable device that comprises a processor 96, a memory 98, a Bluetooth module 100, a display 92, and a user input interface 94. The user input interface 94 can comprise a keypad 93 and touch-sensitive images 95 on the display 92. The memory 98 comprises an operating system 97 with at least one device driver 99. The Bluetooth module 100 comprises an antenna 102 and an RF transceiver 104. Although the PDA 90 is a general purpose portable computing device, and was by no means tailored to function as a remote control for the digital camera 60 of the present invention, it can nevertheless be used as such by virtue of the device driver 99. The device driver 99 runs under the operating system 97 of the PDA (i.e., Windows CE, Linux, Palm OS, etc.), and interfaces with the Bluetooth module 100 of the PDA 90 to configure it for communications with the Bluetooth module 80 of the digital camera 60.

The device driver 99 is initially downloaded into the PDA 90 by the user, and may have been supplied, for example, by the manufacturer of the digital camera 60. The device driver 99, once installed, can utilize the user input interface 94 to present an appropriate keypad for remotely controlling the digital camera 60. After properly configuring the Bluetooth module 100 of the PDA 90, the device driver 99 can receive digital images from the digital camera 60 and show them on the display 92. The device driver 99 can also send control signals to the digital camera 60 according to user input from the reconfigured input interface 94, i.e., from the keypad 93 and the touch-sensitive images 95. The input interface 94 enables the user to send commands to remotely control focus, exposure, or zoom characteristics of the digital image. When received and decoded by the Bluetooth module 80 of the digital camera 60, the processor 78 behaves according to these commands to change the focus, aperture or zoom of the lens 62, or the gain of the AGC 72. This will change the characteristics of the digital image. As with the dedicated remote control discussed previously, the digital images are displayed on the display 92 for the user to peruse at the rate of about 35 frames per second. Thus, the user can instantly see changes to the digital image characteristics. Once satisfied, the user can then use the user input interface 94 to send a shutter command to the digital camera 60, causing it to save the most recent digital image to its memory 76.

It should be clear to those skilled in the art that a Bluetooth-enabled laptop computer could also be used to perform exactly the same function as the PDA 90. Indeed, any general-purpose computing device with a display, a Bluetooth module, and software for configuring the Bluetooth module and interfacing with the keypad or keyboard of the computing device, could be used as a remote control for the digital camera 60. Additionally, the digital cameras 60 and 10 of the present invention could also be fitted with a video output so that they could be electrically connected to a video device for displaying their digital images.

In contrast to the prior art, the present invention utilizes a Bluetooth module to receive control instructions from a remote control, and to transmit digital images to the remote control. By transmitting these digital images to the remote control, the remote control is able to continuously present on its display the most current image from the image-capturing device. A user is thus better able to judge the exposure and composition of an image which he or she wishes to remotely capture.

Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A previewing system comprising a remote control, the remote control detachably fixed to an image-capturing device; the remote control comprising:

a display panel;

a control panel; and a first transceiver; the image-capturing device comprising:

a second transceiver for sending radio signals to the first transceiver and for receiving radio signals from the first transceiver; and a sensor for detecting if the remote control is attached to the image-capturing device and for switching the first and second transceivers to standby mode when the remote control is attached to the image-capturing device;

wherein a user detaches the remote control from the image-capturing device and uses the control panel to remotely control functionality of the image-capturing device, and uses the display panel to preview an image that the image-capturing device will capture.

2. The previewing system of claim 1 wherein the first and second transceivers use a Bluetooth protocol to send and receive the radio signals.

3. The previewing system of claim 2 wherein the remote control sends control signals to the image-capturing device using the Bluetooth protocol, and the image-capturing device sends current image data to the remote control using the Bluetooth protocol so that the display panel can present the image that the image-capturing device will capture.

4. The previewing system of claim 3 wherein the user uses the display panel to verify image characteristics.

5. The previewing system of claim 3 wherein the control signals cause the image-capturing device to change image characteristics.

6. The previewing system of claim 5 wherein the control panel enables the user to send the control signals that change the image characteristics.

7. The previewing system of claim 6 wherein the user uses the control panel to capture the image using the current image characteristics.

8. The previewing system of claim 3 wherein a charged-coupled device (CCD) is used to generate the current image data.

9. The previewing system of claim 8 wherein the image-capturing device is a digital camera.

10. The previewing system of claim 1 wherein the display panel is a liquid crystal display (LCD).

11. A previewing system comprising a remote control and an image capturing device, the remote control and the image-capturing device being separate devices; the remote control comprising:
   a display panel;
   a control panel; and
   a first transceiver; the image-capturing device comprising:
   a second transceiver for sending radio signals to the first transceiver and for receiving radio signals from the first transceiver; and
   a sensor for detecting if the remote control is attached to the image-capturing device and for switching the first and second transceivers to standby mode when the remote control is attached to the image-capturing device;
   wherein a user uses the control panel to remotely control functionality of the image-capturing device, and uses the display panel to view an image that the image-capturing device will capture.

12. The previewing system of claim 11 wherein the first and second transceivers use a Bluetooth protocol to send and receive the radio signals.

13. The previewing system of claim 12 wherein the remote control sends control signals to the image-capturing device using the Bluetooth protocol, and the image-capturing device sends current image data to the remote control using the Bluetooth protocol so that the display panel can present the image that the image-capturing device will capture.

14. The previewing system of claim 13 wherein the user uses the display panel to verify image characteristics.

15. The previewing system of claim 13 wherein the control signals cause the image-capturing device to change image characteristics.

16. The previewing system of claim 15 wherein the control panel enables the user to send the control signals that change the image characteristics.

17. The previewing system of claim 16 wherein the user uses the control panel to capture the image using the current image characteristics.

18. The previewing system of claim 13 wherein a charged-coupled device (CCD) or a CMOS sensor is used to generate the current image data.

19. The previewing system of claim 11 wherein the image-capturing device is a digital camera.

20. The previewing system of claim 11 wherein the remote control is a personal data assistant (PDA), or a portable personal computer (PC).

21. The previewing system of claim 11 wherein the display panel is a liquid crystal display (LCD).

22. A digital camera comprising:
   an image gathering device for generating an image data from an image;
   a lens for focusing the image onto the image gathering device;
   an automatic gain controller (AGC) for controlling gain characteristics of the image gathering device;
   an analog to digital (A/D) converter for converting the image data into a digital image;
   a memory for storing the digital image;
   a Bluetooth module for establishing communications with a remote device; and
   a sensor for detecting if the remote device is attached to the digital camera and for switching the Bluetooth module to standby mode when the remote device is attached to the digital camera;
   wherein the digital camera can use the Bluetooth module to receive control signals from the remote device to control operations of the digital camera, and can send the digital image to the remote device using the Bluetooth module.

23. The digital camera of claim 22 wherein the remote device is a portable device capable of establishing radio signal communications according to a Bluetooth communications protocol, the portable device comprising a keypad and a display panel; wherein a user uses the keypad to control the operations of the digital camera, and the user views the digital image on the display panel.

24. The digital camera of claim 23 wherein the portable device is a personal data assistant (PDA) comprising an operating system, and a device driver running under the operating system that mediates between the hardware of the PDA and the digital camera to enable the user to use the PDA to control the operations of the digital camera, and causes the PDA to show on the display panel the digital image sent by the digital camera.

25. The digital camera of claim 23 wherein the portable device is a laptop computer comprising an operating system, and a device driver running under the operating system that mediates between the hardware of the laptop computer and the digital camera to enable the user to use the laptop computer to control the operations of the digital camera, and causes the laptop computer to show on the display panel the digital image sent by the digital camera.

26. The digital camera of claim 23 wherein the user uses the keypad to change the focus of the lens of the digital camera, and views the effects of the focus change on the display panel.

27. The digital camera of claim 23 wherein the user uses the keypad to change the gain of the AGC to change the exposure of the image, and views the effects of the exposure change on the display panel.

28. The digital camera of claim 23 wherein the user uses the keypad to save the digital image in the memory.

29. The digital camera of claim 23 wherein the remote device is detachably connected to the digital camera.

30. The digital camera of claim 22 wherein the remote device is a device that is separate from the digital camera.

31. The digital camera of claim 22 wherein the image gathering device is a charge-coupled device (CCD).

32. The digital camera of claim 22 wherein the image gathering device is a CMOS sensor.

33. A previewing method for an image-capturing device and a remote control, the remote control comprising a display panel for displaying a preview image sent to the remote control from the image capturing device, a control panel for controlling operations of the image-capturing device, and a first transceiver; the image capturing device comprising a sensor and a second transceiver for sending radio signals to the first transceiver and for receiving radio signals from the first transceiver; the method comprising:

using the image-capturing device to capture an image according to current image capturing characteristics; converting the captured image into a transmission image; sending the transmission image to the remote control; converting the transmission image into a display image;

presenting the display image on the display panel so that a user can preview an image that will be captured by the image-capturing device;

utilizing the sensor to detect if the remote control is attached to the image-capturing device; and switching the first and second transceivers to standby mode when the sensor detects that the remote control is attached to the image-capturing device.

34. The previewing method of claim 33 wherein the second transceiver uses a Bluetooth protocol to send the transmission image, and the first transceiver uses the Bluetooth protocol to receive the transmission image.

35. The previewing method of claim 34 wherein the remote control can send control signals to the image-capturing device using the Bluetooth protocol to change the image capturing characteristics.

36. The previewing method of claim 35 wherein the control panel enables the user to send the control signals that change the image capturing characteristics.

37. The previewing method of claim 33 wherein a charged-coupled device (CCD) is used to capture the image.

38. The previewing method of claim 33 wherein the image-capturing device is a digital camera.

39. The previewing method of claim 33 wherein the display panel is a liquid crystal display (LCD).

* * * * *

UNITED STATES PATENT AND TRADEMARK OFFICE
CERTIFICATE OF CORRECTION

PATENT NO. : 6,809,759 B1
DATED : October 26, 2004
INVENTOR(S) : Chiang

It is certified that error appears in the above-identified patent and that said Letters Patent is hereby corrected as shown below:

Title page,
Item [73], Assignee, change the address from "Tao-Hsien" to -- Tao-Yuan Hsien --

Signed and Sealed this

Fifteenth Day of February, 2005

JON W. DUDAS
*Director of the United States Patent and Trademark Office*